(12) United States Patent
Rakow et al.

(10) Patent No.: US 10,196,817 B2
(45) Date of Patent: Feb. 5, 2019

(54) LOCKING MECHANISM FOR DEPLOYABLE BOOMS

(71) Applicant: Composite Technology Development, Inc., Lafayette, CO (US)

(72) Inventors: Alexi Rakow, Boulder, CO (US); Paul Koenig, Boulder, CO (US); Doug Richardson, Westminster, CO (US); Dana Turse, Broomfield, CO (US); Larry Adams, Thornton, CO (US)

(73) Assignee: Composite Technology Development, Inc., Lafayette, CO (US)

(*) Notice: Subject to any disclaimer, the term of this patent is extended or adjusted under 35 U.S.C. 154(b) by 0 days.

(21) Appl. No.: 15/487,427

(22) Filed: Apr. 13, 2017

(65) Prior Publication Data

US 2017/0298628 A1    Oct. 19, 2017

Related U.S. Application Data

(60) Provisional application No. 62/323,234, filed on Apr. 15, 2016.

(51) Int. Cl.
*E04C 3/00* (2006.01)
*B64G 1/22* (2006.01)

(52) U.S. Cl.
CPC .............. *E04C 3/005* (2013.01); *B64G 1/222* (2013.01)

(58) Field of Classification Search
CPC .......... B64G 1/44; B64G 1/443; B64G 1/446; B64G 1/222; E04H 12/02; E04C 3/005; B65H 2701/371; B65H 75/364

USPC ............ 52/63, 408, 645, 646, 648.1, 650.3, 52/651.01, 651.06, 653.1, 108; 244/159.5, 172.6, 172.7, FOR. 112; 136/244, 245, 292; 242/379.2, 379.5, 242/400, 390.2, 594, 594.1, 595, 595.1, 242/594.2; 74/490.04, 490.01, 490.03, 74/89.2, 89.21, 89.22

See application file for complete search history.

(56) References Cited

U.S. PATENT DOCUMENTS

| | | | | |
|---|---|---|---|---|
| 3,361,377 A | * | 1/1968 | Trexler, Jr. .............. | E04C 3/005 242/390.2 |
| 3,434,674 A | * | 3/1969 | Groskopfs ............... | B64G 9/00 242/390.2 |
| 3,499,610 A | * | 3/1970 | Leonard ................... | B64G 9/00 138/166 |
| 3,589,632 A | * | 6/1971 | Rew ....................... | B21C 47/003 188/82.84 |
| 3,862,528 A | * | 1/1975 | Meissinger .............. | B64G 9/00 242/390.2 |
| 2013/0061541 A1 | * | 3/2013 | Taylor ................. | B29C 67/0014 52/108 |

(Continued)

*Primary Examiner* — Theodore V Adamos (57) ABSTRACT

A boom deployment mechanism is disclosed. The boom deployment mechanism may include a boom, a root plug, and a locking mechanism. In some embodiments, the boom may have a proximal end and a distal end. The boom may have a deployed configuration where the boom has a tubular shape with a slit that extends along the longitudinal length of the boom from the proximal end of the boom to the distal end of the boom. The boom may have a stowed configuration where the boom is flattened and rolled. In some embodiments, the locking mechanism may be configured to secure the proximal end of the boom to the root plug when the boom is in a deployed configuration.

10 Claims, 11 Drawing Sheets

(56) References Cited

U.S. PATENT DOCUMENTS

| | | | |
|---|---|---|---|
| 2014/0123575 A1* | 5/2014 | Bobbio | E04H 12/185 52/108 |
| 2015/0259911 A1* | 9/2015 | Freebury | E04C 3/005 52/108 |
| 2016/0032609 A1* | 2/2016 | Kucinski | B21C 37/0818 52/108 |

* cited by examiner

LOCKING MECHANISM FOR DEPLOYABLE BOOMS

SUMMARY

A boom deployment mechanism according to some embodiments may include a boom having a proximal end, a distal end, and a tubular shape with a slit that extends along the longitudinal length of the boom from the proximal end of the boom to the distal end of the boom. The boom deployment mechanism may include a deployment means for deploying the boom from a stowed configuration where the boom is flattened and rolled to a deployed configuration where the boom is extended in tubular form from the deployment means; a root plug; and locking means for securing the proximal end of the boom to the root plug when the boom is in a deployed configuration.

A boom deployment mechanism according to some embodiments may include a housing; a spool that rotates about a rotation axis, the spool disposed within the housing; a boom with a proximal end; a distal end; and a tubular shape in a deployed configuration with a slit that extends along the longitudinal length of the boom from the proximal end of the boom to the distal end of the boom, the longitudinal length of the boom extending in a direction that is substantially perpendicular to the rotation axis; a root plug disposed within the housing; and a locking mechanism disposed within the housing, the locking mechanism configured to secure the proximal end of the boom to the root plug when the boom is in a deployed configuration.

A boom deployment mechanism according to some embodiments may include a boom, a root plug, and a locking mechanism. In some embodiments, the boom may have a proximal end and a distal end. The boom may have a deployed configuration where the boom has a tubular shape with a slit that extends along the longitudinal length of the boom from the proximal end of the boom to the distal end of the boom. The boom may have a stowed configuration where the boom is flattened and rolled. In some embodiments, the locking mechanism may be configured to secure the proximal end of the boom to the root plug when the boom is in a deployed configuration.

In some embodiments, a boom deployment mechanism may include a housing and the root plug may be coupled with the housing, and/or in the stowed configuration the boom may be flattened and rolled within the housing.

In some embodiments, the locking mechanism further comprises one or more clamps coupled with the proximal end of the boom.

In some embodiments, the root plug has a radius substantially similar to an inner radius of a cross-sectional tubular shape of the boom.

In some embodiments, the locking mechanism may include one or more clamps coupled with the proximal end of the boom; and/or one or more levers configured to engage with the one or more clamps to secure the boom with the root plug.

In some embodiments, the one or more levers include one or more teeth, and wherein the clamps include one or more holes, wherein the one or more teeth engage with the one or more holes to secure the boom with the root plug.

In some embodiments, the locking mechanism may include one or more clamps coupled with the proximal end of the boom; and/or a shaft configured to engage with the one or more clamps to secure the boom with the root plug.

In some embodiments, a boom deployment mechanism may include a motor configured to move the shaft to engage with the one or more clamps.

In some embodiments, the shaft may be configured to move perpendicularly relative to a longitudinal axis of the boom in the deployed configuration.

In some embodiments, a boom deployment mechanism may include two or more teeth coupled with the shaft, wherein the clamps include two or more holes, wherein the two or more teeth engage with the two or more holes to secure the boom with the root plug.

In some embodiments, the locking mechanism comprises a concave portion.

In some embodiments, a boom deployment mechanism may include a housing, and the locking mechanism is configured to rotate relative to the housing.

In some embodiments, the locking mechanism may be biased to rotate from a stowed configuration into a deployed configuration.

In some embodiments, the locking mechanism may rotate around a pivot point on the housing.

In some embodiments, the housing includes an exit aperture through which the boom extends in the deployed configuration, wherein in the deployed configuration a major surface of the locking mechanism is coplanar with the exit aperture.

In some embodiments, the housing includes an exit aperture through which the boom extends in the deployed configuration, wherein in the stowed configuration a major surface of the locking mechanism is perpendicular with the exit aperture.

In some embodiments, a major surface of the locking mechanism is substantially perpendicular with the deployed boom in the deployed configuration.

In some embodiments, a major surface of the locking mechanism is substantially perpendicular with the deployed boom in the deployed configuration.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are disclosed for locking booms with a root locking system. A boom (or longeron) can be used in various configurations to deploy various structures. A boom can be used in terrestrial or celestial applications and/or may be used in conjunction with other booms to form a larger structure. A boom may include a cylindrical (or tubular) shaped member (or longeron) that has a slit that extends along the longitudinal length of the boom so that the boom may be flattened and rolled for stowage and then deployed by unrolling the boom. Some embodiments include systems and methods for retracting, rolling and/or stowing a boom.

In some embodiments, a boom deployment system and/or boom locking system may include a boom, a spool, a root plug, and/or a locking mechanism. In some embodiments, the boom may include a stowed configuration where the boom is flattened and rolled around a spool and/or a deployed configuration. In some embodiments, in the deployed configuration the boom may have a tubular shape with a slit that extends along the longitudinal length of the boom from a proximal end of the boom to a distal end of the boom. In some embodiments, the locking mechanism may be configured to secure the proximal end of the boom to the root plug when the boom is in a deployed configuration.

In some embodiments, a boom deployment system and/or boom locking system may include a housing within which all or portions of the boom deployment system are disposed in the stowed configuration. In some embodiments, the root plug may be securely coupled with the housing. In some embodiments, in the stowed configuration the boom may be flattened and rolled onto a spool disposed within the housing.

In some embodiments, the locking mechanism may include one or more clamps coupled with the proximal end of the boom. The clamps, for example, may be engaged with the engagement mechanism to secure the boom to the root plug. In some embodiments, the clamps may be made from metal or a composite material. In some embodiments, the clamps may wrap around and/or extend around the proximal end of the boom. In some embodiments, the clamps may have an opening that is positioned relative to the slit in the boom. In some embodiments, the engagement mechanism may interact with the boom and/or the clamps at a portion of the boom and/or the clamps having the slit and/or an opening.

In some embodiments, the root plug may have an outside radius substantially similar to the inside radius of the cross-sectional tubular shape of the boom.

Figure 1:
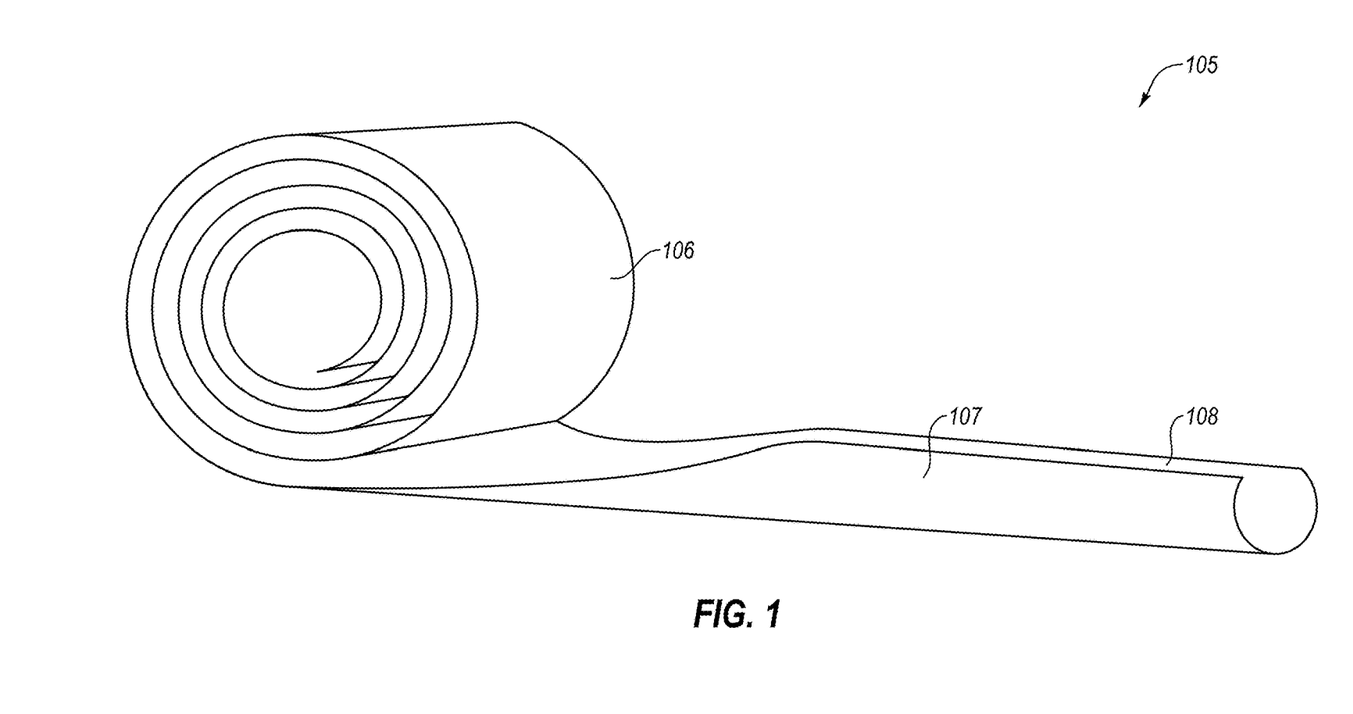
FIG. 1 illustrates an example boom according to some embodiments.

FIG. 1 illustrates an example boom 105. The boom 105 can be flattened and rolled for stowage and then regain its original, unflattened, circular, elliptical, or semi-circular cross-section during deployment. The boom 105 may include a long tube with one or more slits 108 or gaps that extend through all or a portion of the longitudinal length of the boom 105. The boom 105 may include a hollow interior. The slit 108 may allow the boom 105 to be flattened and rolled into a stowed or rolled configuration or extended in a deployed configuration. When rolled, various different booms may be stacked, nested, aligned and/or combined and collectively rolled together. The boom 105 may be constructed from any type of material that may, for example, include metal, graphite, fiber, resins, shape memory materials, composite materials, polymers, etc. In some embodiments, the boom 105 may be constructed from a composite material with a number of plies embedded with a resin.

The boom 105 may have a tubular shape in the deployed configuration and flattened and rolled in the stowed configuration. When rolling a boom 105, the tubular cross-section of the boom 105 can be flattened and/or the boom 105 may be opened along the longitudinal length of the boom 105. The boom 105 can then be rolled into a stowed configuration. In some embodiments, during stowage, portions of the boom 105 may be progressively flattened as the boom 105 is rolled up. In some embodiments, multiple booms can be stacked upon one another, nested or embedded within each other in the tubular or deployed configuration. The combined boom stack can then be rolled along the longitudinal length of the booms into the stowed configuration.

In some embodiments, the boom 105 may include more than one slit along the longitudinal length of the boom 105.

Figure 2:
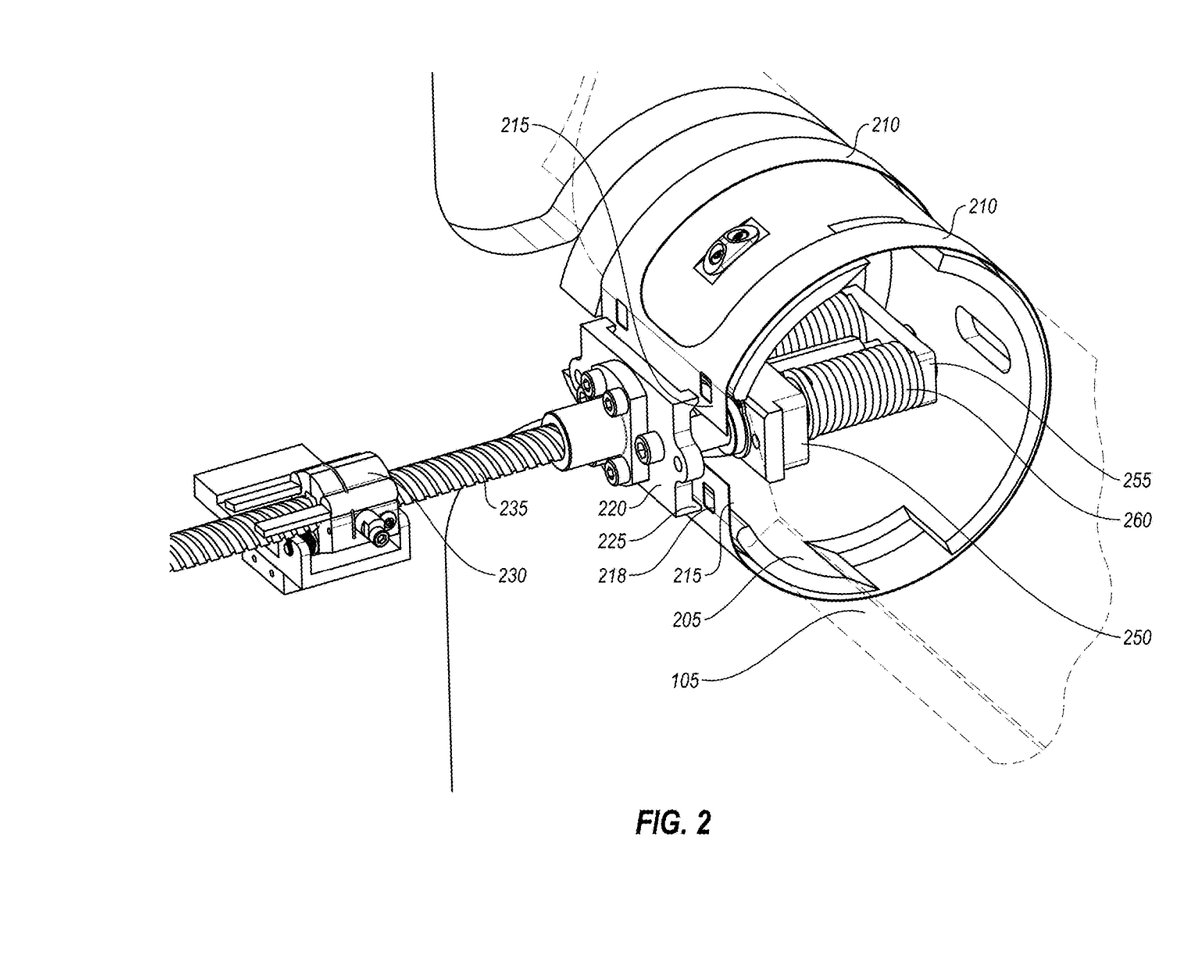
FIG. 2 illustrates a spring-locking mechanism in an unlocked position according to some embodiments.

FIG. 2 illustrates a spring-locking mechanism in an unlocked position according to some embodiments. The spring-locking mechanism may be arranged so that a proximal end of the boom 105 may be wrapped around root plug 205. The proximal end of the boom 105 may include one or more clamps 210 (or bands) that are disposed on the exterior surface of the proximal end of the boom 105. In some embodiments, the clamps 210 may include one or more bands of metallic material (or any other materials such as, for example, composite materials) that may be pulled or tightened to secure the proximal end of the boom 105 to the root plug 205. In some embodiments, the clamps 210 may be circular in shape with an opening that is positioned near the slit in the boom 105.

In some embodiments, the clamps 210 may include and/or be coupled with one or more engagement mechanisms 215 that may include one or more holes 218. The engagement mechanisms 215 may be disposed relative to the boom 105 near a slit in the boom 105 and/or an opening in the clamps 210. The holes 218 in the engagement mechanism 215 may be engaged by teeth 225 in a locking mechanism 220. When the locking mechanism 220 is moved laterally (or perpendicularly relative to the deployed boom) the teeth 225 may engage with the engagement mechanisms 215 and pull the clamps 210 around the proximal end of the boom 105. This action, for example, may secure the boom 105 to the root plug 205.

In some embodiments, a motor 230 may be engaged to move shaft 235 laterally, which may move locking mechanism 220 toward the boom 105 and cause the teeth 225 to engage with the engagement mechanism 215 forcing the clamps 210 to tighten around the boom 105 and the root plug 205. In some embodiments, the shaft 235 may be a threaded shaft. The threads, for example, may be engaged by the motor 230 to move the shaft 235 laterally.

Figure 3:
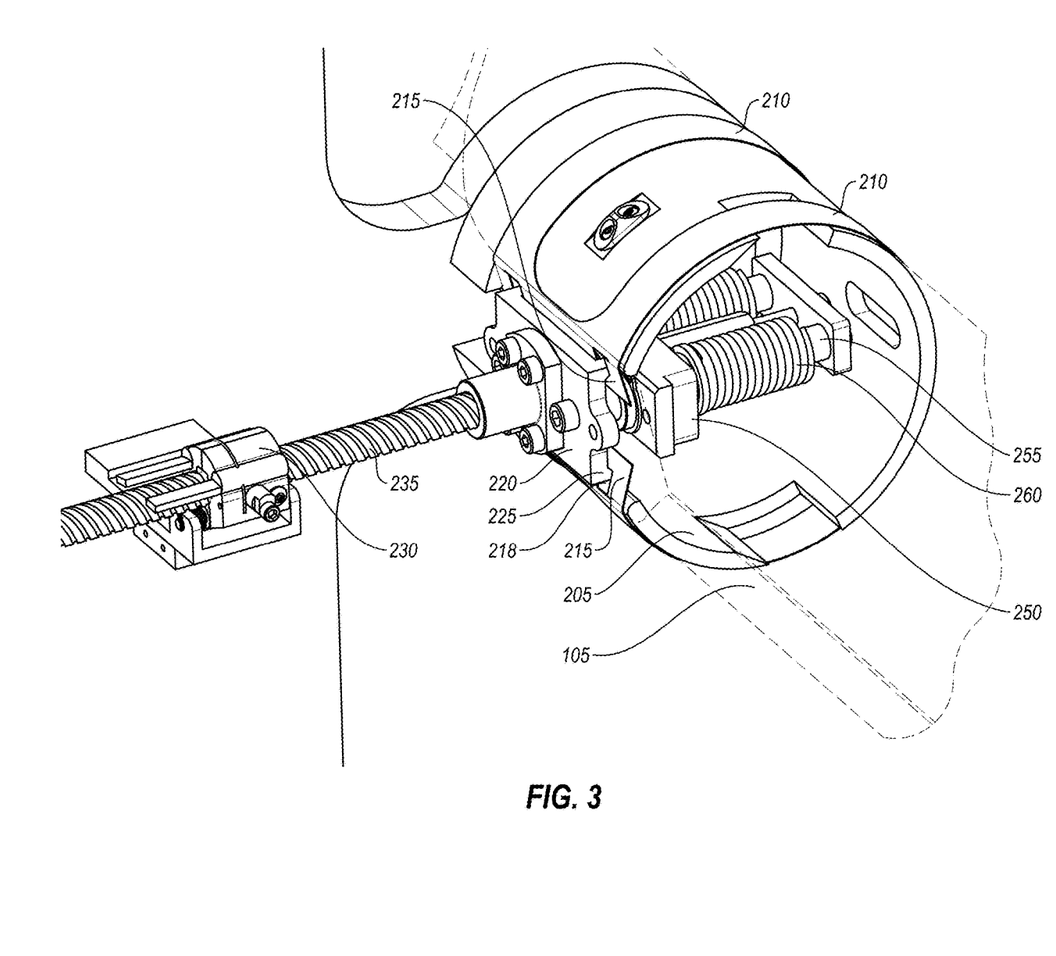
FIG. 3 illustrates the spring-locking mechanism in a locked configuration according to some embodiments.

FIG. 3 illustrates the spring-locking mechanism in a locked configuration. In this configuration, the locking mechanism 220 has been moved relative to the boom 105 and the teeth 225 are engaged with the engagement mechanism 215. This engagement pulls the clamps 210 so that the clamps may tighten and engage with the boom 105 and/or the root plug 205.

In some embodiments, springs 255 may be engaged within the root plug 205 to press the interior base 250 toward the locking mechanism 220. This may allow for additional engagement between the locking mechanism 220 and the engagement mechanism 215. In some embodiments, the interior base 250 may engage and/or lock with the locking mechanism 220.

Figure 4:
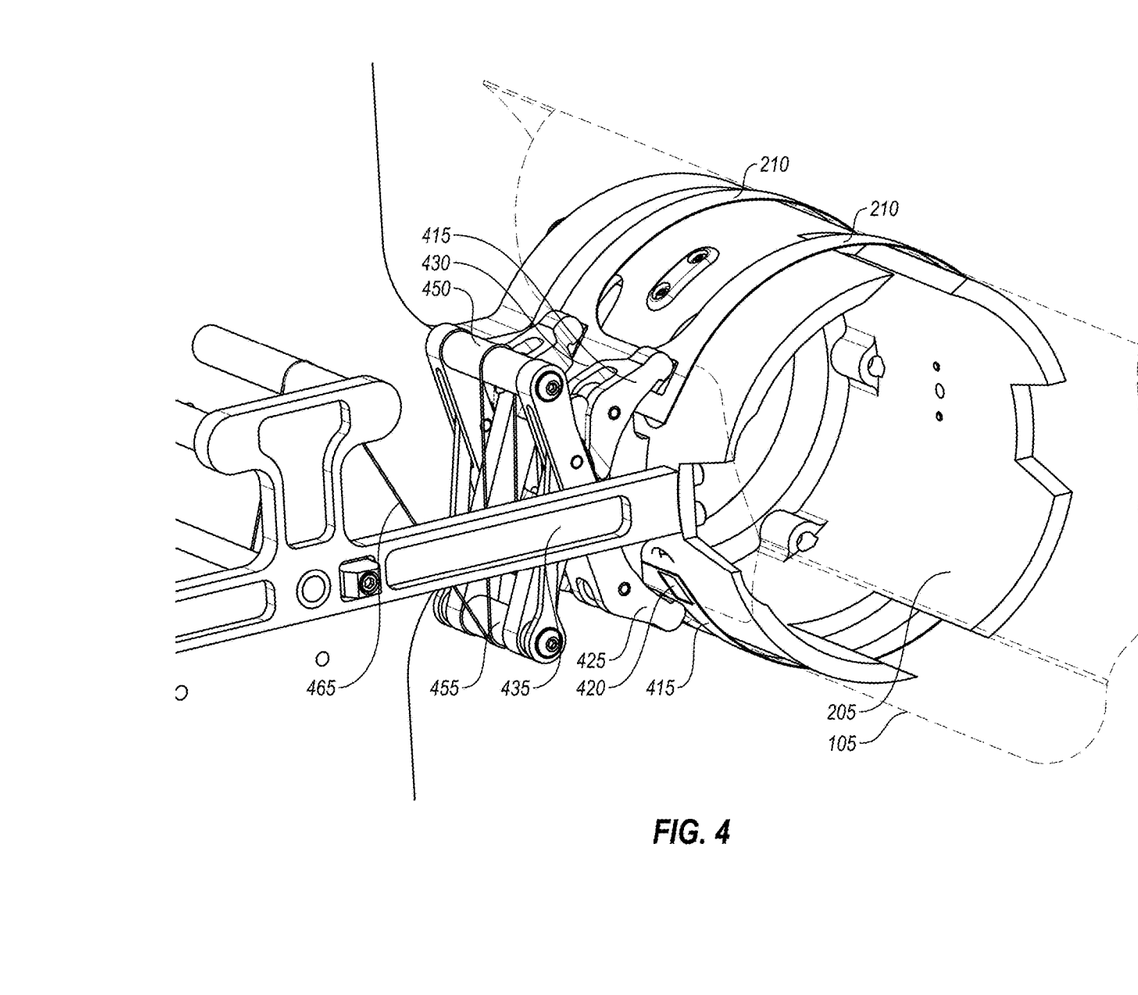
FIG. 4 illustrates a clamp-locking mechanism in an unclamped configuration according to some embodiments.

FIG. 4 illustrates a clamp-locking mechanism in an unclamped configuration according to some embodiments. A proximal end of the boom 105 is wrapped around root plug 205. The proximal end of the boom 105 may include one or more clamps 210 (or bands) that are disposed on the exterior surface of the proximal end of the boom 105. In some embodiments, the clamps 210 may include one or more bands of metallic material that may be pulled or tightened to secure the proximal end of the boom 105 to the root plug 205.

In some embodiments, the clamps 210 may include and/or be coupled with one or more locking mechanisms 415 that may include one or more holes 420 such as, for example, two holes 420 on each locking mechanism 415. The locking mechanisms 415 may be disposed on the boom 105 near a slit of the boom 105 and/or an opening the clamps 210.

In some embodiments, the locking mechanisms 415 may engage with the proximal end of a first lever 425 and/or the proximal end of a second lever 430. As shown in FIG. 4, the proximal end of the first lever 425 and/or the proximal end of the second lever 430 are not yet engaged with the locking mechanism 415. In some embodiments, the proximal end of the first lever 425 and/or the proximal end of the second lever 430, may have teeth that extend from the proximal end of the first lever 425 and/or the proximal end of the second lever 430 that can engage with the holes 420 of the locking mechanism 415.

In some embodiments, the first lever 425 and/or the second lever 430 may be coupled with one or more support structures 435. In some embodiments, the point where the first lever 425 and/or the second lever 430 are coupled with the one or more support structures 435 may create a fulcrum point. In some embodiments, the distal end 450 of the first lever 425 and/or the distal end 455 of the second lever 430 may be connected with an actuator such as, for example, via cord 465. When the actuator moves the distal end 450 of the first lever 425 and/or the distal end 455 of the second lever 430 this movement may cause a corresponding movement with the proximal end of the first lever 425 and/or the proximal end of the second lever 430 that may engage the proximal end of the first lever 425 and/or the proximal end of the second lever 430 with the locking mechanism 415. This engagement between the locking mechanism 415 with the second lever 430 and/or first lever 425 may tighten the clamps 210 around the boom 105 and/or the root lock 205.

In some embodiments, a cord 465 can be coupled with either or both the distal end 450 of the first lever 425 and the distal end 455 of the second lever 430. When the cord 465 is pulled or reeled onto a spool the cord may cause either or both the distal end 450 of the first lever 425 and/or the distal end 455 of the second lever 430 to pull together causing a scissoring action through the fulcrum point to have the proximal end of the first lever 425 and/or the proximal end of the second lever 430 engage with the proximal end of the first lever 425 and/or the proximal end of the second lever 430. Various other techniques may be used to move either or both the distal end 450 of the first lever 425 and/or the distal end 455 of the second lever 430 such as, for example, using a linear actuator or a motor.

Figure 5:
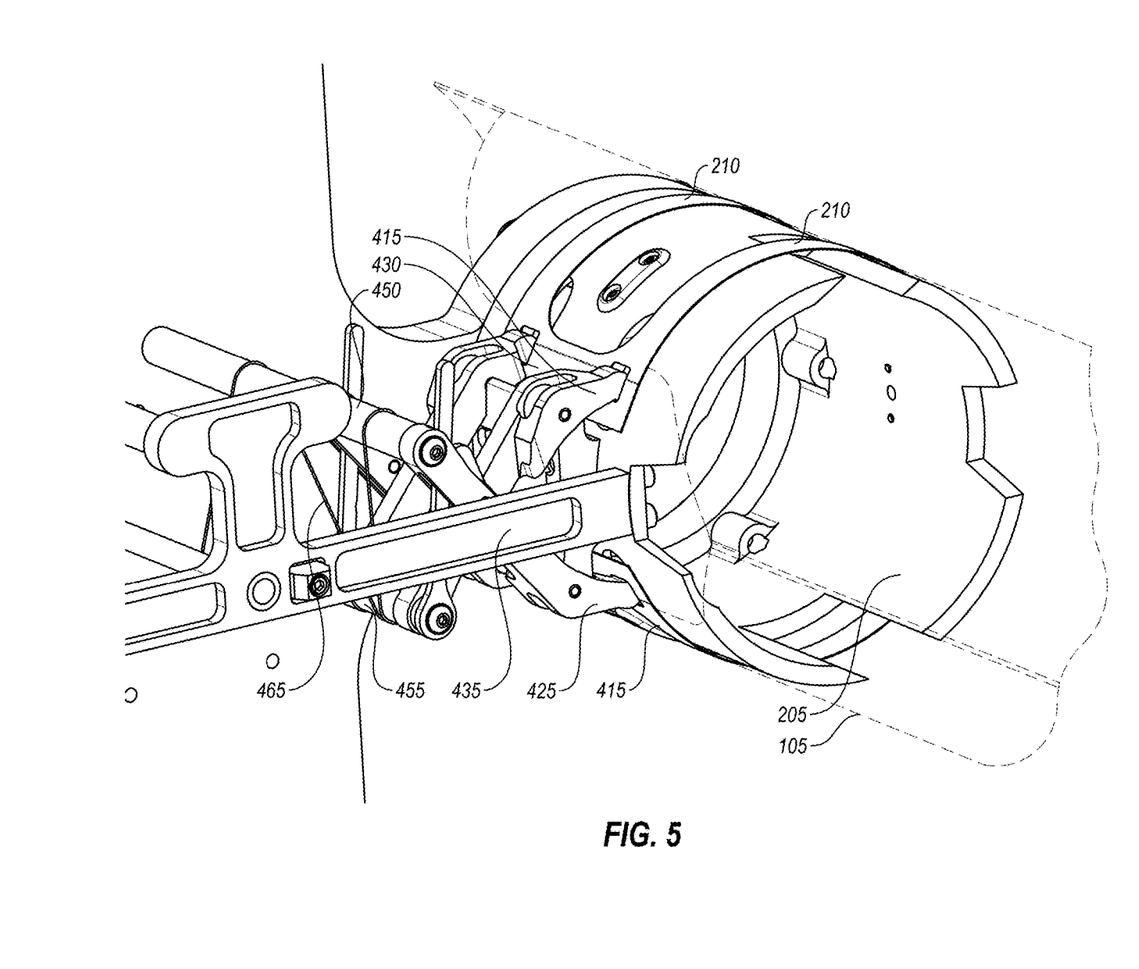
FIG. 5 illustrates the clamp-locking mechanism in a clamped configuration according to some embodiments.

FIG. 5 illustrates the clamp-locking mechanism in a clamped configuration according to some embodiments. In this configuration, for example, the cord 465 has been engaged causing the distal end 450 of the first lever 425 and the distal end 455 of the second lever 430 to be pulled together. This action causes the proximal end of the first lever 425 and/or the proximal end of the second lever 430 to engage with the locking mechanism 415. By pulling the locking mechanisms, the clamps 210 are tightened around the boom 105 and the root lock 205.

Figure 6:
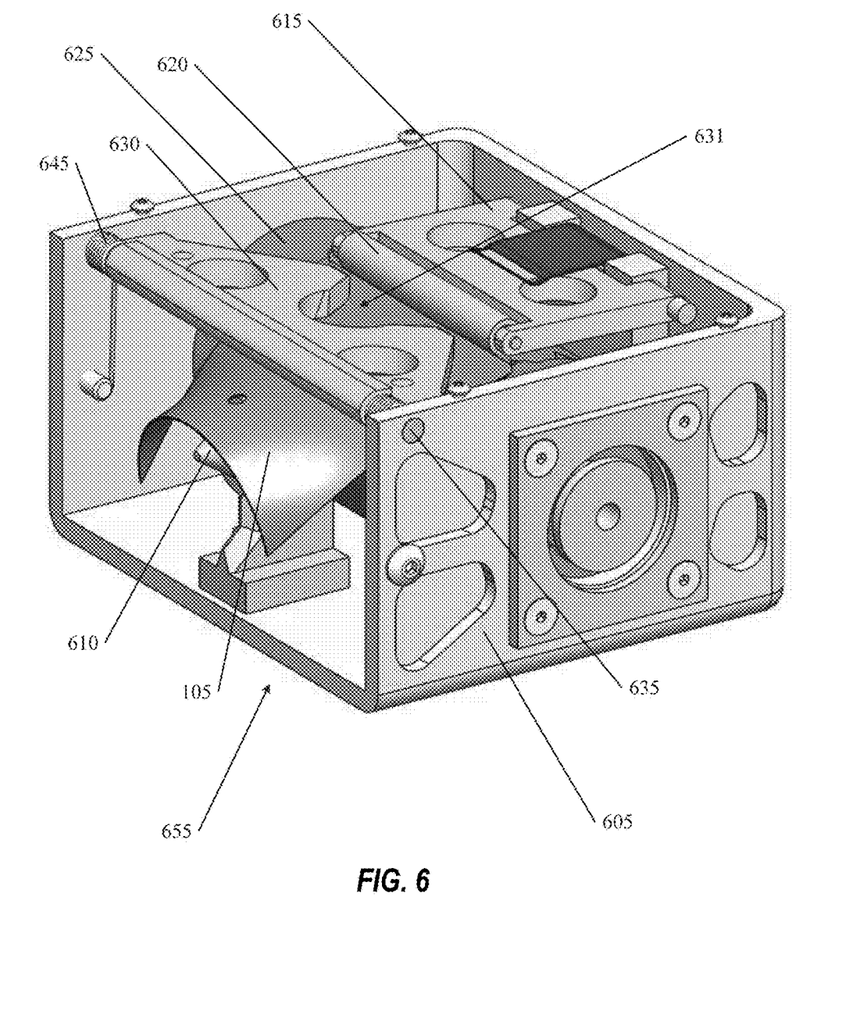
FIG. 6 illustrates a boom locking mechanism with the boom in a stowed configuration according to some embodiments.

FIG. 6 illustrates a boom locking mechanism with the boom 105 in a stowed configuration according to some embodiments. The boom 105 is flattened and rolled about a spool 625 and disposed within housing 605 in the stowed configuration. The spool 625 may be coupled with a motor and/or gears that may be used to rotate the spool 625 causing the boom 105 to be deployed. A deployment guide 610 (or root plug) may also disposed within the housing 605. During deployment of the boom 105, the boom may transform from the flattened configuration into an elongated tubular shape with a slit along the longitudinal length.

In some embodiments, a compaction roller 615 may be coupled with the housing 605. In some embodiments, the compaction roller 615 may be pivotable about a pivot point on the housing 605. In some embodiments, the compaction roller 615 may be spring loaded. In some embodiments, the compaction roller 615 may be biased to provide a downward force on the top of the spool 625 so that as the boom is deployed from the spool 625 the boom will deploy out the exit aperture 655 of the housing 605 shown in the figure. In some embodiments, the exit aperture 655 may include a portion of the housing 605 and/or an aperture from which the boom may be deployed. In some embodiments, the compaction roller 615 may include one or more rollers 620.

In some embodiments, a locking mechanism 630 may be positioned forward from the spool 625 toward an exit aperture 655 of the housing 605. In some embodiments, the locking mechanism 630 may be disposed substantially near or in conjunction with the deployment guide 610. In some embodiments, the locking mechanism 630 may be shaped with a concave portion 631. In some embodiments, the concave portion 631 may have roughly or substantially the same radius of the boom when deployed. In some embodiments, the concave portion 631 may have a radius that is 2-10% greater than the radius of the boom when deployed. In some embodiments, the locking mechanism 630 may be pivotably rotated relative to the housing 605 about pivot point 635. In some embodiments, the concave portion 631 may include a semicircular portion. In some embodiments, the concave portion 631 may be disposed on the locking mechanism opposite the axis of rotation or pivot.

In some embodiments, in the stowed configuration the locking mechanism 630 may be disposed so that at least one major plane of the locking mechanism 630 is substantially parallel with the deployed direction of the boom 105 and/or substantially perpendicular with the exit plane of the exit aperture 655. In some embodiments, the locking mechanism 630 may be biased to return to a position so that at least one major plane of the locking mechanism 630 is substantially parallel with the exit aperture 655 and/or substantially perpendicular with a longitudinal axis of a deployed axis of the boom 105. In some embodiments, a major plane of the locking mechanism 630 may comprise a plane having the most or second most surface area of any plane of the locking mechanism 630. In some embodiments, the locking mechanism 630 may be biased to rotate into the locked and/or deployed configuration by spring 645.

In some embodiments, the locking mechanism 630 may be biased to rotate from an unlocked and/or stowed configuration to a locked and/or deployed configuration. In the unlocked and/or stowed configuration, the locking mechanism 630 the locking mechanism may be restricted from rotating into the locked and/or deployed configuration by a portion of the flattened boom 105 coming off the spool 625 as shown in FIG. 6.

Figure 7:
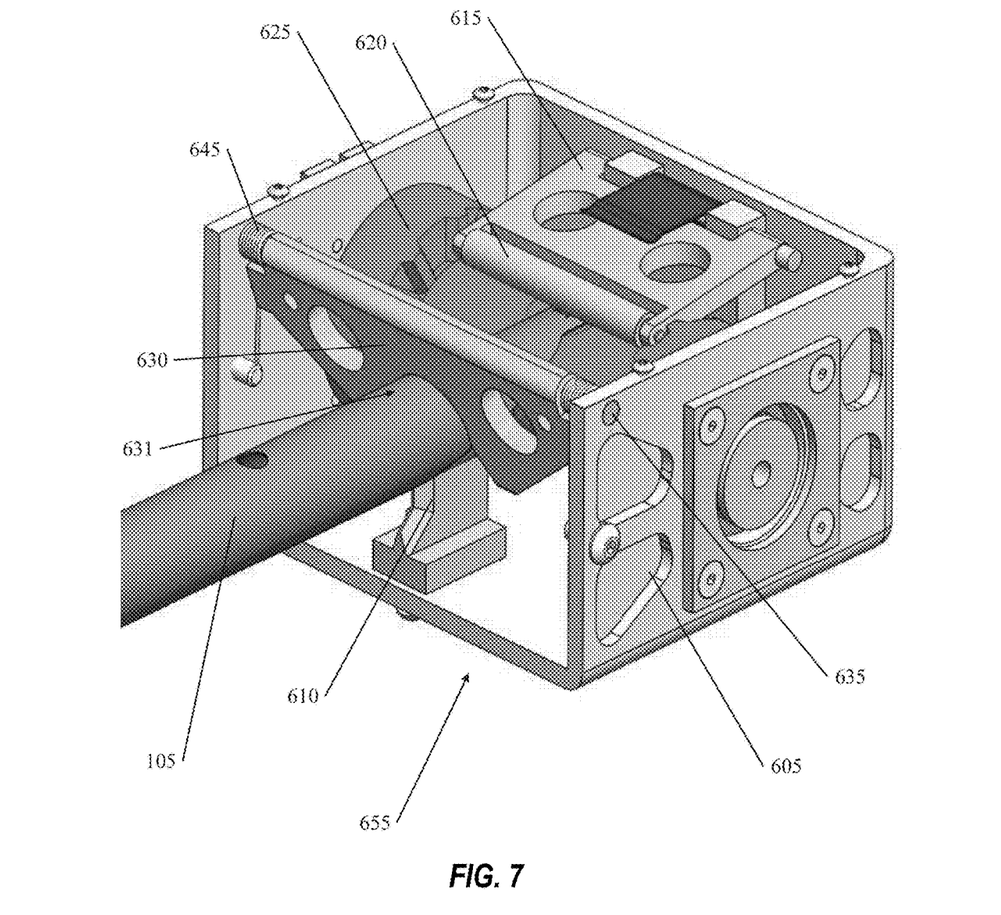
FIG. 7 illustrates a boom locking mechanism with the boom in a deployed configuration according to some embodiments.

When the proximal end of the boom 105 has not yet been deployed from the spool 625, the flattened portion of the boom 105 may restrict the locking mechanism 630 from rotating into the locked and/or deployed configuration. Once the proximal end of the boom 105 has been deployed and is no longer flat, the locking mechanism 630 will rotate into the locked and/or deployed configuration as shown in FIG. 7. In some embodiments, in the locked and/or deployed configuration at least one major plane of the locking mechanism may be coplanar with the exit plane of the exit aperature 655. In some embodiments, in the locked and/or deployed configuration the proximal end of the boom 105 may be wrapped at least partially around the deployment guide 610 and/or the concave portion 631 of the locking mechanism 630 and/or may secure the proximal end of the boom 105 to the deployment guide 610.

In some embodiments, the locking mechanism 630 may be locked into place after rotating into the locked and/or deployed configuration so that the locking mechanism 630 may not rotate back into the unlocked and/or stowed configuration. In some embodiments, a detent or other spring loaded mechanism maybe used to lock the locking mechanism into place in the locked and/or deployed configuration.

In some embodiments, the locking mechanism 630 may not be locked into place after rotating into the locked and/or deployed configuration so that the locking mechanism 630 may rotate back into the unlocked and/or stowed configuration such as, for example, if the boom 105 is returned to the stowed configuration. The boom 105 as it is reeled back onto the spool 625 may flattened causing the locking mechanism 630 to rotate back into the stowed and/or unlocked configuration.

FIG. 7 illustrates a boom locking mechanism with the boom in a deployed configuration according to some embodiments. In this configuration, the boom 105 is deployed having its tubular shape. As shown the proximal end of the boom 105 is secured around the deployment guide 610 by the concave portion 631 of the locking mechanism 630.

In some embodiments, the locking mechanism 630 may rotate approximately 90 degrees between the locked and/or deployed configuration and the unlocked and/or stowed configuration.

Figure 8:
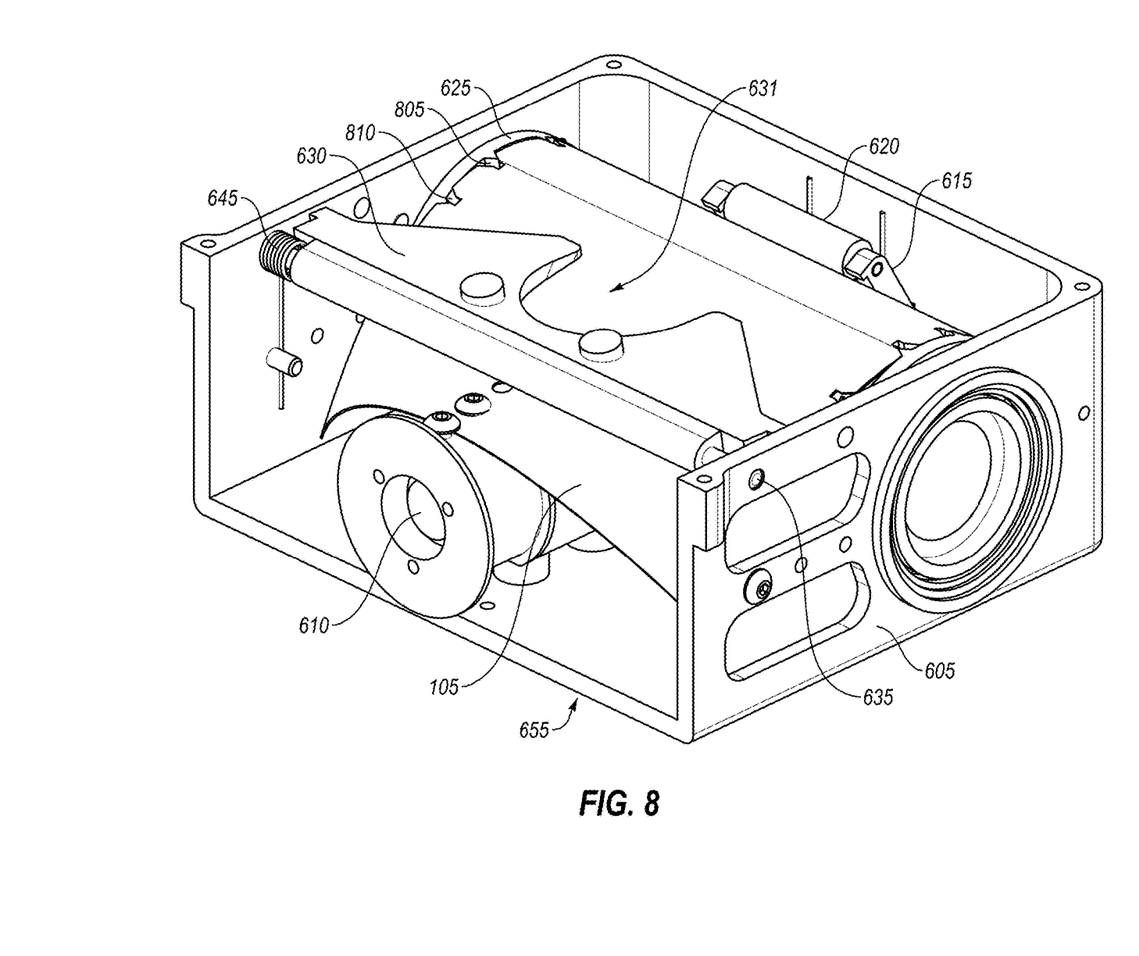
FIG. 8 illustrates a boom locking mechanism with the boom in a stowed configuration according to some embodiments.
Figure 9:
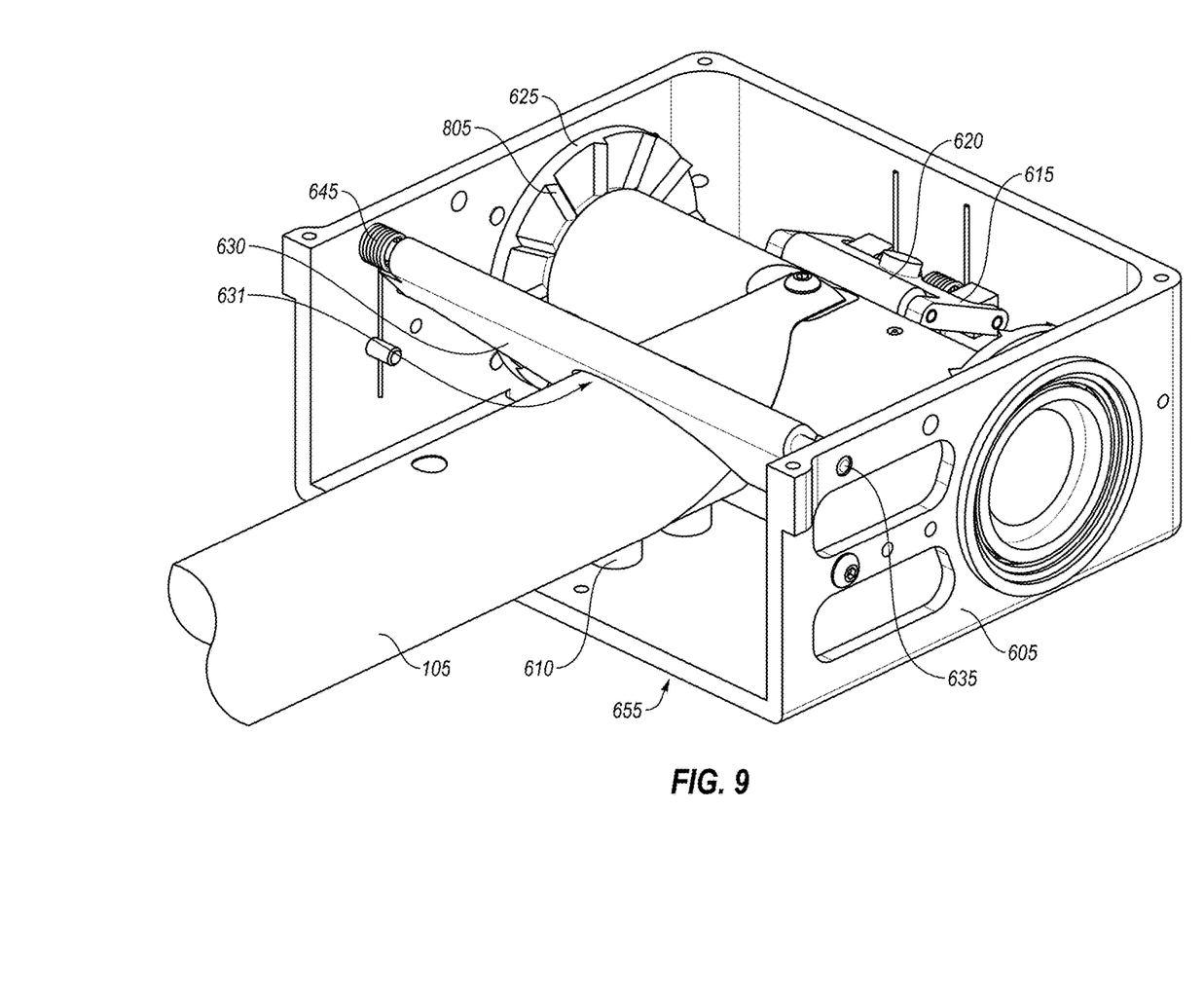
FIG. 9 illustrates a boom locking mechanism with the boom in a deployed configuration according to some embodiments.

FIG. 8 illustrates a boom locking mechanism with the boom 105 in a stowed configuration according to some embodiments. The boom 105 is flattened and rolled about a spool 625 and disposed within housing 605 in the stowed configuration. The spool 625 may be coupled with a motor and/or gears that may be used to rotate the spool 625 causing the boom to be deployed. The spool 625 may include a plurality of teeth 805 (or detents) on both spool ends as shown in FIG. 9. The teeth 805, for example, may extend radially about the spool 625. In some embodiments, the teeth 805 may extend from the surface of the both spool ends, for example, in a direction normal from the surface of the spool ends. The teeth 805 may have a triangular or rectangular cross section.

The longitudinal edges of the boom 105 may include a plurality of notches 810 that extend along the length of the longitudinal edges of the boom 105. These notches may be sized and spaced to correspond with the size and space of the teeth 805. In some embodiments, the plurality of notches on the longitudinal edges of the boom 105 may extend along the edges of the boom 105 that form the slit. In some embodiments, the spaces between each of the plurality of notches on the longitudinal edges of the boom 105 may be spaced further apart toward the distal end of the boom 105 than at the proximal end of the boom. This spacing may, for example, accommodate the larger radius of the flattened boom 105 as it is rolled around the spool 625.

In some embodiments, the distal end of the boom 105 may be coupled with a root plug 815 in both the stowed configuration and the deployed configuration.

A deployment guide 610 may also be disposed within the housing 605. During deployment of the boom 105, the boom 105 may transform from the flattened configuration into an elongated tubular shape with a slit along the longitudinal length.

In some embodiments, a compaction roller 615 may be coupled with the housing 605. In some embodiments, the compaction roller 615 may be pivotable about a pivot point on the housing 605. In some embodiments, the compaction roller 615 may be spring loaded. In some embodiments, the compaction roller 615 may provide a downward force on the top of the spool 625 so that as the boom 105 may be deployed from the spool 625 the boom 105 will deploy out the exit aperture 655 of the housing 605 shown in the figure. In some embodiments, the exit aperture 655 may include a portion of the housing 605 and/or an aperture from which the boom may be deployed. In some embodiments, the compaction roller 615 may include one or more rollers 620.

In some embodiments, a locking mechanism 630 may be positioned forward from the spool 625 toward an exit aperture 655 of the housing 605. In some embodiments, the locking mechanism 630 may be disposed substantially near or in conjunction with the deployment guide 610. In some embodiments, the concave portion 631 may have a radius that is 2-10% greater than the radius of the boom 105 when deployed. In some embodiments, the locking mechanism 630 may be pivotably rotated relative to the housing 605 about pivot point 635. In some embodiments, the concave portion 631 may include a semicircular portion. In some embodiments, the locking mechanism 630 may be shaped with a concave portion 631. The concave portion 631, for example, may have roughly or substantially the same radius of the boom when deployed. In some embodiments, the concave portion 631 may be disposed on the locking mechanism opposite the axis of rotation or pivot.

In some embodiments, in the stowed configuration the locking mechanism 630 may be disposed so that at least one major plane of the locking mechanism 630 is substantially parallel with the deployed direction of the boom 105 and/or substantially perpendicular with the exit plane 655. In some embodiments, the locking mechanism 630 may be biased to return to a position so that at least one major plane of the locking mechanism 630 is substantially parallel with the exit aperture 655 and/or substantially perpendicular with a longitudinal axis of a deployed axis of the boom 105. In some embodiments, a major plane of the locking mechanism 630 may comprise a plane having the most or second most surface area of any plane of the locking mechanism 630. In some embodiments, the locking mechanism 630 may be biased to rotate into the locked and/or deployed configuration by spring 645.

In some embodiments, the locking mechanism 630 may be biased to rotate from an unlocked and/or stowed configuration to a locked and/or deployed configuration. In the unlocked and/or stowed configuration, the locking mechanism 630 may be restricted from rotating into the locked and/or deployed configuration by a portion of the flattened boom 105 coming off the spool 625 as shown in FIG. 6.

When the proximal end of the boom 105 has not yet been deployed from the spool 625, the flattened portion of the boom 105 may restrict the locking mechanism 630 from rotating into the locked and/or deployed configuration. Once the proximal end of the boom 105 has been deployed and is no longer flat, the locking mechanism 630 will rotate into the locked and/or deployed configuration as shown in FIG. 9. In some embodiments, in the locked and/or deployed configuration at least one major plane of the locking mechanism 630 may be coplanar with the exit plane of the exit aperture 655. In some embodiments, in the locked and/or deployed configuration the proximal end of the boom 105 may be wrapped at least partially around the deployment guide 610 and/or the concave portion 631 of the locking mechanism 630 may secure the proximal end of the boom 105 to the deployment guide 610.

In some embodiments, the locking mechanism 630 may be locked into place after rotating into the locked and/or deployed configuration so that the locking mechanism 630 may not rotate back into the unlocked and/or stowed configuration. In some embodiments, a detent or other spring loaded mechanism maybe used to lock the locking mechanism 630 into place in the locked and/or deployed configuration.

In some embodiments, the locking mechanism 630 may not be locked into place after rotating into the locked and/or deployed configuration so that the locking mechanism 630 may rotate back into the unlocked and/or stowed configuration such as, for example, if the boom 105 is returned to the stowed configuration. The boom 105 as it is reeled back onto the spool 625 may flattened causing the locking mechanism 630 to rotate back into the stowed and/or unlocked configuration.

FIG. 9 illustrates a boom locking mechanism with the boom 105 in a deployed configuration according to some embodiments. In this configuration, the boom 105 is deployed having its tubular shape. As shown the proximal end of the boom 105 is secured around the deployment guide 610 by the concave portion 631 of the locking mechanism 630.

In some embodiments, the locking mechanism 630 may rotate approximately 90 degrees between the locked and/or deployed configuration and the unlocked and/or stowed configuration.

In some embodiments, a boom locking mechanism in any embodiment may include one or more electronic sensors that can communicate information regarding the relative deployment of the boom. For example, the boom locking mechanism may include a rotational sensor coupled with the spool 625 that may provide an analog or digital signal to a controller that can be used to determine the number of rotations of the spool 625, which can then correspond to the relative deployment of the boom. As another example, the boom locking mechanism may include a sensor coupled with the locking mechanism 630 that provides a signal when the locking mechanism 630 has rotated in to the deployed configuration.

Figure 10:
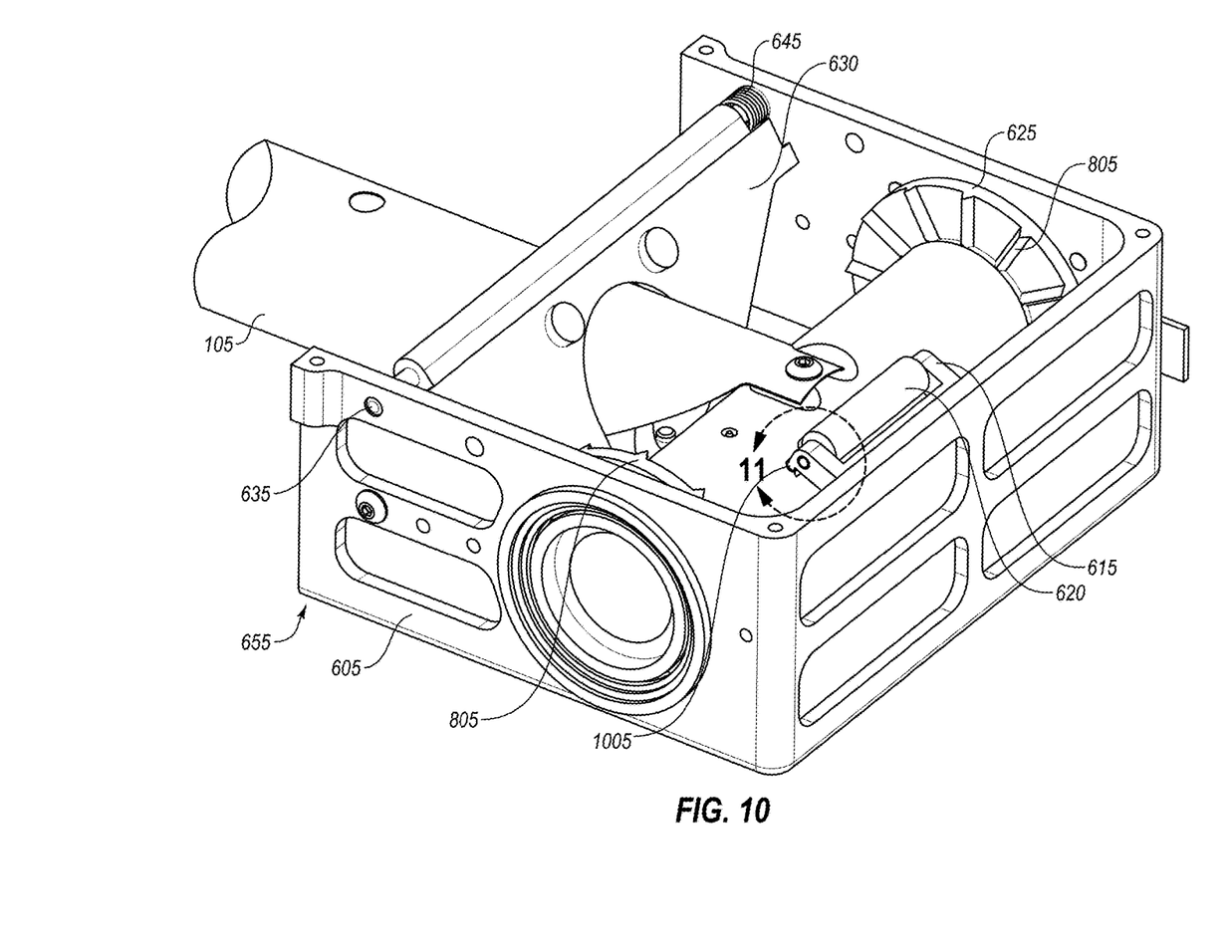
FIG. 10 illustrates a boom locking mechanism with the boom in a deployed configuration according to some embodiments.
Figure 11:
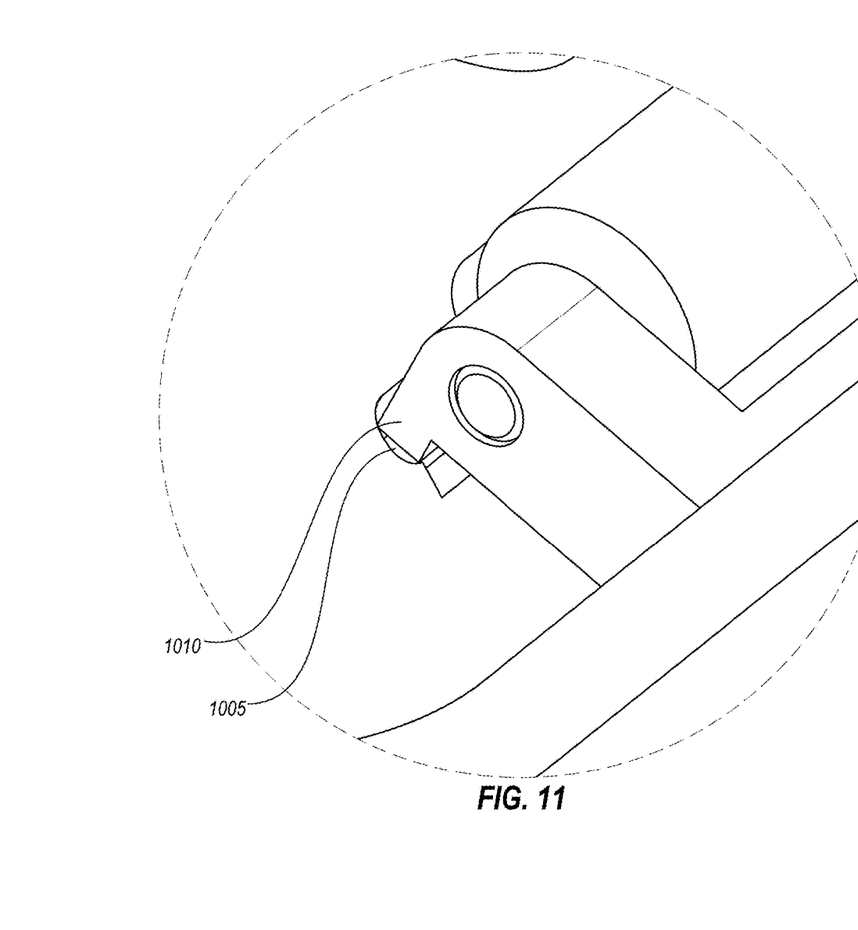
FIG. 11 illustrates a zoomed in portion of a boom locking mechanism with the boom in a deployed configuration according to some embodiments.

FIG. 10 illustrates a boom locking mechanism with the boom 105 in a deployed configuration according to some embodiments. The compaction roller 615 includes two arms coupled on each side of the roller 620. Each arm includes a tooth 1005 (or teeth 1005: a first tooth and a second tooth). The spool 625 may include one or more slots 1010 that may be exposed when the boom 105 is deployed. When the one or more slots 1010 are exposed, one or both of the teeth 1005 of the compaction roller 615 may engage with one or more slots 1010 as shown in FIG. 11. This engagement, for example, may lock the spool 625 into place and/or locking the boom 105 in the deployed configuration.

In some embodiments, a boom locking mechanism may include sensors that can be used to indicate the relative state of the boom such as, for example, when the boom is stowed or deployed. For example, the spool 625 may include a rotary sensor that may provide an analog or digital signal to a controller that indicates the angular position of the spool 625 and/or the number of rotations of the spool 625. As another example, the compaction roller 615 may include a position sensor that may provide an analog or digital signal to a controller that indicates the position of the compaction roller 615. As another example, the compaction roller 615 may include a contact sensor (e.g., a capacitive sensor) that may provide an analog or digital signal to a controller that indicates when one or both of the teeth 1005 have made contact with the spool 625. As another example, the roller 620 may include a rotary sensor that may provide an analog or digital signal to a controller that indicates the angular position of the roller 620 and/or the number of rotations of the roller 620. As another example, the locking mechanism 630 may include a angular position sensor that may provide an analog or digital signal to a controller that indicates the angular position of the locking mechanism 630.

The term "substantially" and/or the term "about" means within 5% or 10% of the value referred to or within manufacturing tolerances.

Various embodiments are disclosed. The various embodiments may be partially or completely combined to produce other embodiments.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

That which is claimed:
1. A boom deployment mechanism comprising:
  a boom comprising:
    a proximal end;
    a distal end;

a deployed configuration where the boom has a tubular shape with a slit that extends along the longitudinal length of the boom from the proximal end of the boom to the distal end of the boom; and a stowed configuration where the boom is flattened and rolled;

a root plug;

a locking mechanism comprising a panel having a major surface and a concave portion, the locking mechanism configured to secure the proximal end of the boom to the root plug when the boom is in the deployed configuration; and a housing that includes an exit aperture through which the boom extends in the deployed configuration;

wherein in the stowed configuration the locking mechanism is in a first position, and wherein in the deployed configuration the panel of the locking mechanism is rotated from the first position to a second position such that in the second position the concave portion of the panel is positioned to secure the proximal end of the boom relative to the root plug and the major surface of the panel is substantially perpendicular with the boom in the deployed configuration.

2. The boom deployment mechanism according to claim 1, wherein the root plug is coupled with the housing, and wherein in the stowed configuration the boom is flattened and rolled within the housing.

3. The boom deployment mechanism according to claim 1, wherein the root plug has a radius substantially similar to an inner radius of a cross-sectional tubular shape of the boom.

4. The boom deployment mechanism according to claim 1, wherein the locking mechanism is configured to rotate relative to the housing.

5. The boom deployment mechanism according to claim 4, wherein the locking mechanism is biased to rotate when the boom transitions from the stowed configuration into the deployed configuration.

6. The boom deployment mechanism according to claim 4, wherein the locking mechanism rotates around a pivot point on the housing.

7. The boom deployment mechanism according to claim 4, wherein in the deployed configuration the major surface of the locking mechanism is coplanar with the exit aperture.

8. The boom deployment mechanism according to claim 4, wherein in the stowed configuration the major surface of the locking mechanism is perpendicular with the exit aperture.

9. A boom deployment mechanism comprising:

a housing having an exit aperture;

a boom having a proximal end, a distal end, and a tubular shape with a slit that extends along the longitudinal length of the boom from the proximal end of the boom to the distal end of the boom;

deployment means for deploying the boom from a stowed configuration where the boom is flattened and rolled to a deployed configuration where the boom is extended in tubular form from the deployment means and extending through the exit aperture;

a root plug; and locking means for securing the proximal end of the boom to the root plug when the boom is in the deployed configuration, wherein the locking means includes a panel having a major surface and a concave surface;

wherein in the stowed configuration the locking means is in a first position, and wherein in the deployed configuration the panel is rotated from the first position to a second position such that in the second position the panel is positioned to secure the proximal end of the boom relative to the root plug and the major surface of the panel is substantially perpendicular with the boom when the boom is in the deployed configuration.

10. A boom deployment mechanism comprising:

a housing;

a spool having at least one slot;

a compaction roller having at least one tooth biased toward the spool, the spool rotates about a rotation axis, the compaction roller disposed within the housing;

a boom comprising:
    a proximal end;
    a distal end; and
    a stowed configuration where the boom is flattened and rolled about the spool such that the at least one slot is covered by the boom when the boom is rolled about the spool;
    a tubular shape in a deployed configuration with a slit that extends along the longitudinal length of the boom from the proximal end of the boom to the distal end of the boom, the longitudinal length of the boom extending in a direction that is substantially perpendicular to the rotation axis;

a root plug disposed within the housing; and a locking mechanism disposed within the housing, the locking mechanism configured to secure the proximal end of the boom to the root plug when the boom is in the deployed configuration;

wherein in the deployed configuration, the at least one tooth is engaged with the at least one slot in the spool.

* * * * *